(12) United States Patent
Roche et al.

(10) Patent No.: US 9,547,699 B2
(45) Date of Patent: Jan. 17, 2017

(54) PROVIDING ENHANCED CONNECTION DATA FOR SHARED RESOURCES

(71) Applicant: Microsoft Technology Licensing, LLC, Redmond, WA (US)

(72) Inventors: Matthew Roche, Bothell, WA (US); Christian Liensberger, Bellevue, WA (US); Ziv Kasperski, Redmond, WA (US); Stéphane Nyombayire, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 391 days.

(21) Appl. No.: 14/082,451

(22) Filed: Nov. 18, 2013

(65) Prior Publication Data
US 2015/0074078 A1  Mar. 12, 2015

Related U.S. Application Data

(60) Provisional application No. 61/875,582, filed on Sep. 9, 2013.

(51) Int. Cl.
*G06F 17/30* (2006.01)
*G06F 3/0481* (2013.01)
*G06F 3/0484* (2013.01)

(52) U.S. Cl.
CPC ... *G06F 17/30554* (2013.01); *G06F 17/30864* (2013.01); *G06F 3/0481* (2013.01); *G06F 3/04842* (2013.01); *G06F 17/30651* (2013.01)

(58) Field of Classification Search
None
See application file for complete search history.

(56) References Cited

U.S. PATENT DOCUMENTS

| 6,438,580 | B1 | 8/2002 | Mears et al. |
| 6,901,394 | B2 | 5/2005 | Chauhan et al. |

(Continued)

OTHER PUBLICATIONS

Office Action dated Sep. 30, 2015 cited in U.S. Appl. No. 14/082,401.

(Continued)

*Primary Examiner* — Richard Bowen
(74) *Attorney, Agent, or Firm* — Nicholas Chen; Kate Drakos; Micky Minhas

(57) ABSTRACT

Embodiments are directed to establishing a metadata repository that aggregates metadata for a plurality of data sources, inferring data source metadata at a metadata repository and to providing recommendations to data managers based on aggregated inputs. In one scenario, a computer system establishes a reference to one or more data sources, where each data source includes data elements. The computer system receives a data request for specified data elements stored on the data sources and accesses the established references to determine which data source the specified data elements are stored on. The computer system then retrieves at least one of the specified data elements from its determined data source and sends the retrieved data elements to a specified computer system, along with an indication of additional data elements that are relevant to the received data request, and a further indication of how those additional data elements are to be accessed.

20 Claims, 5 Drawing Sheets

(56) References Cited

U.S. PATENT DOCUMENTS

| | | | |
|---|---|---|---|
| 8,200,661 B1* | 6/2012 | Pearce | G06F 17/30867 707/721 |
| 8,447,760 B1* | 5/2013 | Tong | G06F 17/3053 707/714 |
| 8,478,693 B1 | 7/2013 | Weigle et al. | |
| 8,521,655 B2 | 8/2013 | Carter | |
| 8,856,165 B1 | 10/2014 | Ciernak | |
| 9,043,942 B1 | 5/2015 | Birdwell Rockson et al. | |
| 2001/0047279 A1 | 11/2001 | Gargone | |
| 2003/0050976 A1 | 3/2003 | Block et al. | |
| 2003/0074277 A1 | 4/2003 | Foutz | |
| 2006/0004749 A1 | 1/2006 | Dettinger et al. | |
| 2007/0005568 A1* | 1/2007 | Angelo | G06F 17/30864 |
| 2007/0043735 A1* | 2/2007 | Bodin | G06F 17/30964 |
| 2007/0056034 A1 | 3/2007 | Fernstrom | |
| 2007/0162417 A1 | 7/2007 | Cozianu et al. | |
| 2007/0233685 A1 | 10/2007 | Burns et al. | |
| 2008/0040388 A1* | 2/2008 | Petri | G06F 17/30144 |
| 2009/0006374 A1* | 1/2009 | Kim | G06F 17/30699 |
| 2009/0077043 A1 | 3/2009 | Chang | |
| 2009/0112868 A1 | 4/2009 | Rajamani et al. | |
| 2009/0150827 A1* | 6/2009 | Meyer | G06F 17/30867 715/810 |
| 2010/0057686 A1 | 3/2010 | Breiner et al. | |
| 2010/0161382 A1 | 6/2010 | Cole | |
| 2010/0250867 A1* | 9/2010 | Bettger | G06F 17/30587 711/152 |
| 2011/0231317 A1 | 9/2011 | Arsac | |
| 2011/0302290 A1 | 12/2011 | Westerfeld et al. | |
| 2011/0314071 A1 | 12/2011 | Johnson et al. | |
| 2012/0185779 A1 | 7/2012 | Dugan et al. | |
| 2012/0291090 A1 | 11/2012 | Srinivasan et al. | |
| 2013/0191418 A1 | 7/2013 | Martin et al. | |
| 2014/0164080 A1 | 6/2014 | Thompson, Jr. et al. | |
| 2014/0279893 A1* | 9/2014 | Branton | G06F 17/30994 707/634 |

OTHER PUBLICATIONS

Office Action dated Sep. 14, 2015 cited in U.S. Appl. No. 14/082,481.
"Request Access to Internal Data Sources", Retrieved on: Sep. 5, 2013, Available at: http://office.microsoft.com/en-us/office365-sharepoint-online-enterprise-help/request-access-to-internal-data-sources-HA104079181.aspx.
Mitra, Saurav, "Why SAP Data Services", Published on: Oct. 10, 2012, Available at: http://www.dwbiconcepts.com/etl/23-etl-bods/116-why-sap-businessobjects-data-services.html.
"Manage Data Source Information using the Manage Data Portal", Retrieved on: Sep. 5, 2013, Available at: http://office.microsoft.com/en-us/office365-sharepoint-online-enterprise-help/manage-data-source-information-using-the-manage-data-portal-HA104079190.aspx.
"Understanding the Role of Data Stewards in Data Management", Retrieved on: Sep. 5, 2013, Available at: http://office.microsoft.com/en-us/office365-sharepoint-online-enterprise-help/understanding-the-role-of-data-stewards-in-data-management-HA104079191.aspx?CTT=5&origin=HA104079181.
Serra, Anabela, "Operational Data Store (ODS) and Enterprise Data Warehouse (EDW)", Published on: Jun. 29, 2012, Available at: http://www.dhs.gov/xlibrary/assets/privacy/privacy_pia_fema_ods_edw_20120629.pdf.
"Create, Modify, and Delete Shared Data Sources (SSRS)", Published on: Oct. 18, 2007, Available at: http://technet.microsoft.com/en-us/library/ms155845.aspx.
Gazan, Rich, "Social Annotations in Digital Library Collections", In D-Lib Magazine, vol. 14, Issue 11/12, Nov. 2008, 11 pages.
Office Action dated Mar. 17, 2016 cited in U.S. Appl. No. 14/082,401.
Office Action dated Jul. 15, 2016 cited in U.S. Appl. No. 14/082,401.
Office Action dated Sep. 16, 2016 cited in U.S. Appl. No. 14/082,481.
Notice of Allowance dated Nov. 4, 2016 cited in U.S. Appl. No. 14/082,401.

* cited by examiner

PROVIDING ENHANCED CONNECTION DATA FOR SHARED RESOURCES

CROSS-REFERENCE TO RELATED APPLICATIONS

This application claims priority to and the benefit of U.S. Provisional Patent Application Ser. No. 61/875,582, entitled "Providing Supplemental Connection Data to Access Shared Resources", filed on Sep. 9, 2013, which application is incorporated by reference in its entirety herein. This application is also related to U.S. patent application Ser. No. 14/082,401, entitled "Interfaces for Accessing and Managing Enhanced Connection Data for Shared Resources", and U.S. patent application Ser. No. 14/082,481, entitled "Interfaces for Providing Enhanced Connection Data for Shared Resources", both of which are filed concurrently herewith. Both related applications are incorporated by reference in their entirety herein.

BACKGROUND

Computer databases have long been used to store and provide access to data. Computer databases allow users to enter queries and receive results that are intended to satisfy the query. In many cases, the user's query may be answered by data that is stored in multiple different databases. The user may not know that the data they desire to access is stored on these databases, and, even if the user is aware of the data's location, the user may not know how to access the data. This data is often referred to as "dark data". The dark data is data that is required (or is at least useful) in answering the user's query, but is not accessible by the user.

BRIEF SUMMARY

Embodiments described herein are directed to establishing a metadata repository that aggregates metadata for a plurality of data sources, inferring data source metadata at a metadata repository and to providing recommendations to data managers based on aggregated inputs. In one embodiment, a computer system establishes a reference to one or more data sources, where each data source includes data elements. The computer system receives a data request for specified data elements stored on the data sources and accesses at least one of the established references to determine which data source the specified data elements are stored on. The computer system then retrieves at least one of the specified data elements from its determined data source and sends the retrieved data elements to a specified computer system, along with an indication of additional data elements that are relevant to the received data request, and a further indication of how those additional data elements are to be accessed.

In another embodiment, a computer system infers data source metadata at a metadata repository. The computer system accesses a reference to a specified data source which includes one or more data elements. The computer system further accesses at least one of the following: data elements stored on the data source, data lineage information, data relationships and metadata associated with the data source. The computer system then infers, from the data elements stored on the data source, the data lineage information, the data relationships and/or the metadata associated with the data source, various attributes that are to be associated with the data source. The computer system also appends metadata to the specified data source, where the metadata includes the inferred attributes that are associated with the data source.

In yet another embodiment, a computer system provides recommendations to data managers based on aggregated inputs. A metadata repository receives inputs from a first data manager verifying or creating a data relationship between data elements or data sources. The computer system aggregates the inputs from the first data manager over a period of time and determines, from the aggregated inputs, that upon receiving a predetermined input from a second data manager, a specified recommendation will be provided on subsequent data manager inputs. The computer system then generates the specified recommendation upon determining that the second data manager has provided at least one of the predetermined inputs, and provides the generated recommendation to the second, different data manager based on the second data manager's input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
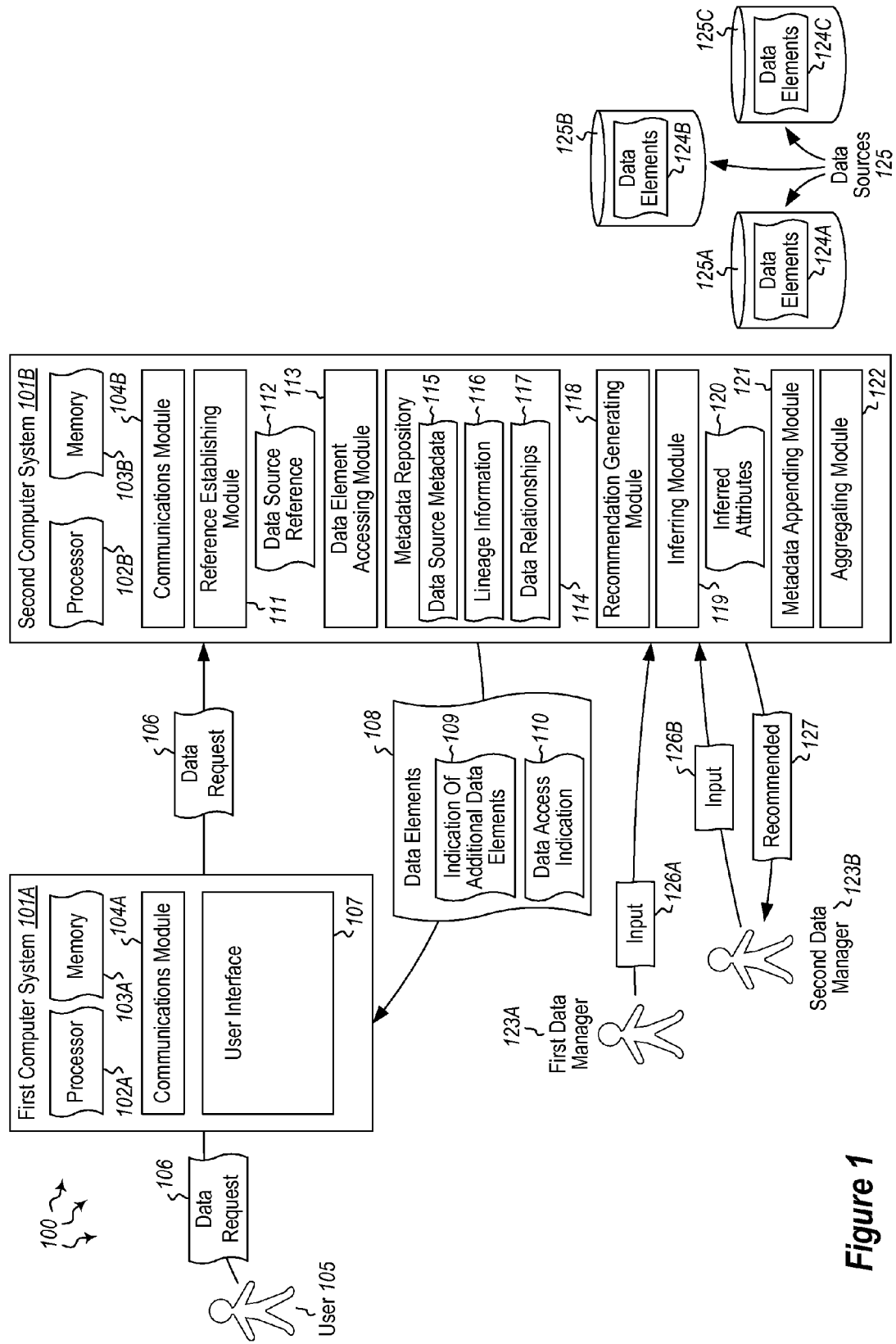
FIG. 1 illustrates a computer architecture in which embodiments described herein may operate including establishing a metadata repository that aggregates metadata for a plurality of data sources.

Embodiments described herein are directed to establishing a metadata repository that aggregates metadata for a plurality of data sources, inferring data source metadata at a metadata repository and to providing recommendations to data managers based on aggregated inputs. In one embodiment, a computer system establishes a reference to one or more data sources, where each data source includes data elements. The computer system receives a data request for specified data elements stored on the data sources and accesses at least one of the established references to determine which data source the specified data elements are stored on. The computer system then retrieves at least one of the specified data elements from its determined data source and sends the retrieved data elements to a specified computer system, along with an indication of additional data elements that are relevant to the received data request, and a further indication of how those additional data elements are to be accessed.

In another embodiment, a computer system infers data source metadata at a metadata repository. The computer system accesses a reference to a specified data source which includes one or more data elements. The computer system further accesses at least one of the following: data elements stored on the data source, data lineage information, data relationships and metadata associated with the data source. The computer system then infers, from the data elements stored on the data source, the data lineage information, the data relationships and/or the metadata associated with the data source, various attributes that are to be associated with the data source. The computer system also appends metadata to the specified data source, where the metadata includes the inferred attributes that are associated with the data source.

In yet another embodiment, a computer system provides recommendations to data managers based on aggregated inputs. A metadata repository receives inputs from a first data manager verifying or creating a data relationship between data elements or data sources. The computer system aggregates the inputs from the first data manager over a period of time and determines, from the aggregated inputs, that upon receiving a predetermined input from a second data manager, a specified recommendation will be provided on subsequent data manager inputs. The computer system then generates the specified recommendation upon determining that the second data manager has provided at least one of the predetermined inputs, and provides the generated recommendation to the second, different data manager based on the second data manager's input.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, a computing system 101A typically includes at least one processing unit 102A and memory 103A. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103A of the computing system 101A. Computing system 101A may also contain communication channels that allow the computing system 101A to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103A. The system memory may also be referred to as "main memory", and includes memory locations that are addressable by the at least one processing unit 102A over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer systems 101A and 101B. Computer systems 101A and 101B may each be any type of local or distributed computer system, including cloud computing systems. The computer systems include various modules for performing different functions. For instance, communications modules 104A/104B are configured to communicate with other computer systems, typically via wired or wireless connections. The communications modules may, for example, receive inputs from users such as user 105. The communication modules 104A/104B may also transmit data to and from each other, to and from the various data sources 125, and to and from other computer systems not shown in FIG. 1.

The data sources 125A-C may be any type of data stores including local data stores, distributed data stores, storage area networks (SANs) or other systems or means for storing data. Each data source 125 stores data elements 124A-C. The data elements may be any portion of data including individual data files or groups of files, database columns or rows or other data structures. The data sources may be local or remote to first computer system 101A and/or second computer system 101B. Both the first and second computer systems may have access to all or portions of the data sources 125, depending on the current computer user's data access rights.

For instance, user 105 may wish to perform a query against one or more of the data sources 125. The user may provide a data request 106 that includes search criteria identifying the data that is being requested. The data request 106 is transmitted from the first computer system 101A to the second computer system 101B. The reference establishing module 111 on the second computer system 101B may have established one or more data source references 112 which link data elements (e.g. 124A-C) to various data sources (e.g. 125A-C). These data source references may be used by the data element accessing module 113 to access the data elements requested in the data request 106. These data elements 108 may then be sent to the first computer system 101A for display on user interface 107.

In some cases, the data element accessing module 113 may determine that additional data elements relevant to the data request exist, but are not currently accessible to the user 105. For example, the additional data elements may be secured behind a data access wall that prevents unauthorized access. The user may, however, be able to access these data elements upon proper authentication. The second computer system 101B may send back any query results that were found within data elements to which the user has access, and may further include an indication 109 of those additional data elements that are relevant to the user-provided data request 106, but not currently accessible to the user. The indication may further indicate one or more steps the user is to take in order to access the additional data.

In this manner, embodiments described herein provide business users and other end-users with relevant information when they attempt to connect to a data source. For example, when a connection dialog box (or similar user experience) is displayed to a user (e.g. 105), the system described herein will display an option for the user to view data source documentation, and may further display an option to initiate a defined business process (e.g. workflow entry point 123) to request access to the data source 125.

A metadata repository 114 may be provided that stores metadata 115 about data sources 125 and other objects. The metadata repository may be a service, including a local service or a cloud-based service. The data source metadata 115 maintained by the metadata repository 114 may include data source locations (e.g. data element links), business documentation (along with other information about the data sources), and workflow entry points. The metadata repository 114 may also include lineage information 116 and data relationship information 117. The lineage information 116 may indicate a data file's history including its creation date, who created it, its parent information, and so on. The relationship information 117 may include indications of the data file's sibling or other, less direct relationships with other data. With this information, the system can surface related and relevant information to the user.

For example, if the data request does not include a specific request to access information, the system can look back in lineage information 116 to infer the request access information. Moreover, the system implements containers such that it understands and can interpret an element that is hosted within another element, and can propagate metadata within containers and for related data sources in this manner. As such, if metadata has not been provided for a database, the system can look at the data element's container (the database server) and infer metadata from the container, or from other related data sources.

In some embodiments, metadata provided by multiple items in the lineage or container chain may be blended together to provide the end-user a full 360 degree view of the information that is available and that they are interacting with. The system also supports multiple automatic algorithms to infer additional metadata (certification, column names, lineage, container relationships, descriptions, etc.) by looking at the structure of the data, the structure of metadata that surrounds the current set of metadata (e.g. similar columns in the same data source), metadata that has been provided earlier by the same author or other authors that are interacting with the system, or through other means. The system can automatically look at the lineage of data to understand whether a current data artifact should be certified, what categorization and classification should be applied and then apply and/or certify it. If requested, the system may provide information on how the attributes were gathered and display that information to the user.

Annotations and metadata for data sources can also be provided in social form. As at least some embodiments of the metadata catalog run as a service within the cloud (indeed, the metadata catalog may run locally, distributed or in a federated system), multiple people that interact with the service can provide annotations (social annotations/metadata). These are then applied or, in some cases, first approved by a user, a quorum of users (e.g. people that are endorsing or using the data source(s)), or by a central authority. The system can also learn from this and automatically approve annotations in the future. As such, the system can learn from all the input that is provided, and can automatically identify types of data (columns, tables, datasets) by observing how authors provide this information manually and then suggesting best matches in the future.

A client application experience allows users to share data objects. The client application (which may run locally, distributed or on a federated system) may send data source metadata, including data storage locations and connection details, to the cloud service. The client application may also be used to provide and surface metadata. The client application further interacts with the metadata catalog service 119 to provide the interface where the service would expose the supplemental data to the end-user. The client application can also be an application that sits in the cloud or on the machine of the user 105 (e.g. computer system 101A).

A stewardship application may also be provided (which may be different than, or part of the client application) that allows authorized users to modify or annotate data sources with additional metadata. The authorized users may modify or annotate data sources by adding documentation and the entry point (such as a URL or email address) for a data access business workflow. Still further, a data consumption/analysis application experience may be provided that retrieves data source metadata from the cloud service and presents it to the user 105 in the context of connecting to a secure data source.

In some embodiments, a list of known data sources 504 may be provided in a data manager portal, and exposed to authorized data managers (e.g. 123A and 123B). As used herein, the term "authorized data managers" may refer to administrators, stewards, data experts or other users that are authorized to make changes to the metadata repository 114. Using the data manager portal, company data managers, curators or owners may provide data source metadata 115 for data sources 125, supplementing any existing metadata (such as location and type) with business- or user-friendly names and descriptions, and further provide an entry point for a business process to request access to the data source. This entry point may be an email address, a web page URL, or any URI-addressable endpoint. This manager-provided metadata is stored in the metadata repository 114.

Subsequently, when users use the client application to connect to a data source (e.g. 125A), the connection experience will display the friendly name and business description for the data source, along with a link to request access to the data. Users who do not have the requisite permissions to access to the data source can select this link to initiate the request access workflow. The connection experience (both the discovery of data sources and the display of metadata and access link) can be presented in any client application that communicates with the metadata catalog, including standalone client applications and clients that are built in to other applications or services.

In still other embodiments, the recommendation generating module 118 of computer system 101B may generate recommendations for data managers based on received inputs. For example, first data manager 123A may provide inputs 124A which add or modify data source metadata 115, lineage information 116 and/or relationship information 117. The recommendation generating module 118 may receive many such inputs over time, from data manager 123A and other data managers. Based on these inputs, the computer system 101 B may learn and provide recommendations 125 based on the learned behavior. Thus, for instance, if multiple data mangers are making the same or similar changes to metadata for a given data source, the aggregating module 122 may aggregate the inputs and form a consensus as to specific changes (e.g. a name change for a column of data). In such cases, the recommendation 127 may indicate that a specific change be made by the second data manager 123B when the second data manager is entering changes for that data source. These concepts will be explained further below with regard to methods 200, 300 and 400 of FIGS. 2, 3 and 4, respectively.

Figure 2:
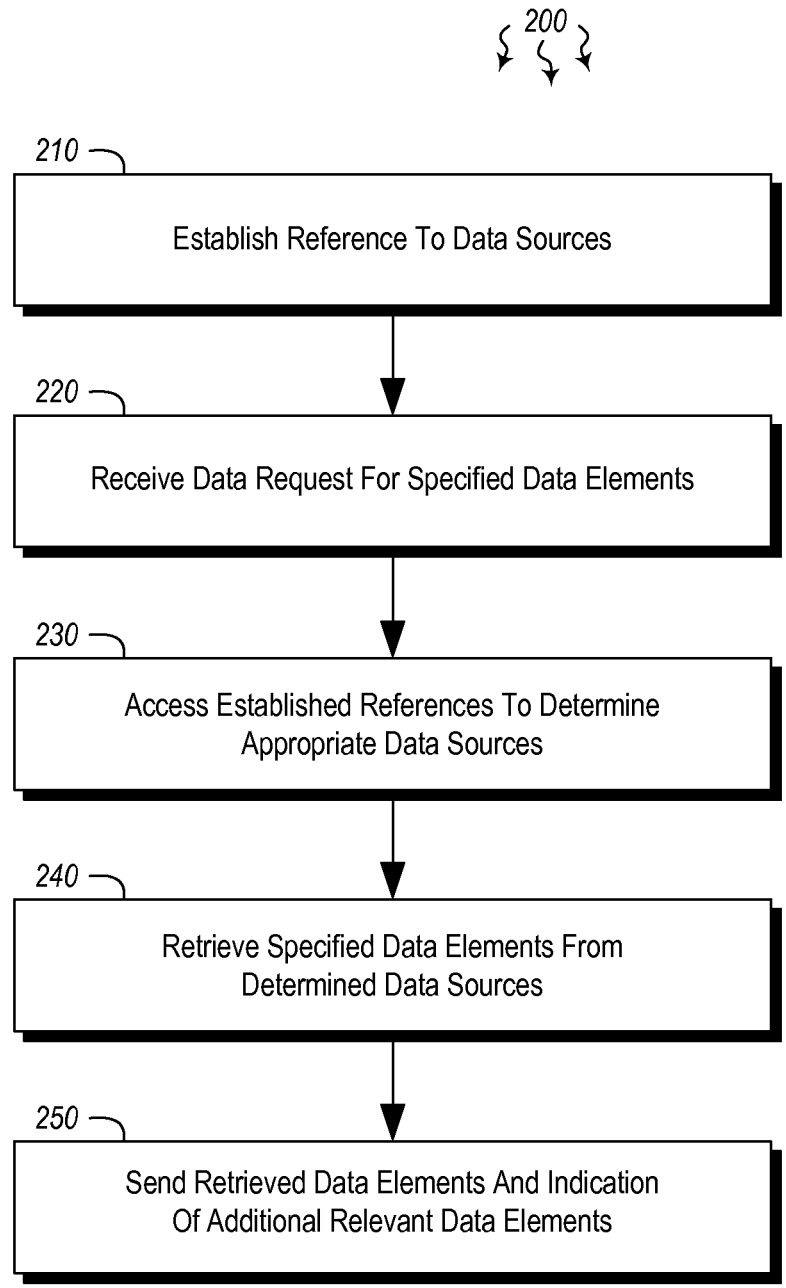
FIG. 2 illustrates a flowchart of an example method for establishing a metadata repository that aggregates metadata for a plurality of data sources.
Figure 3:
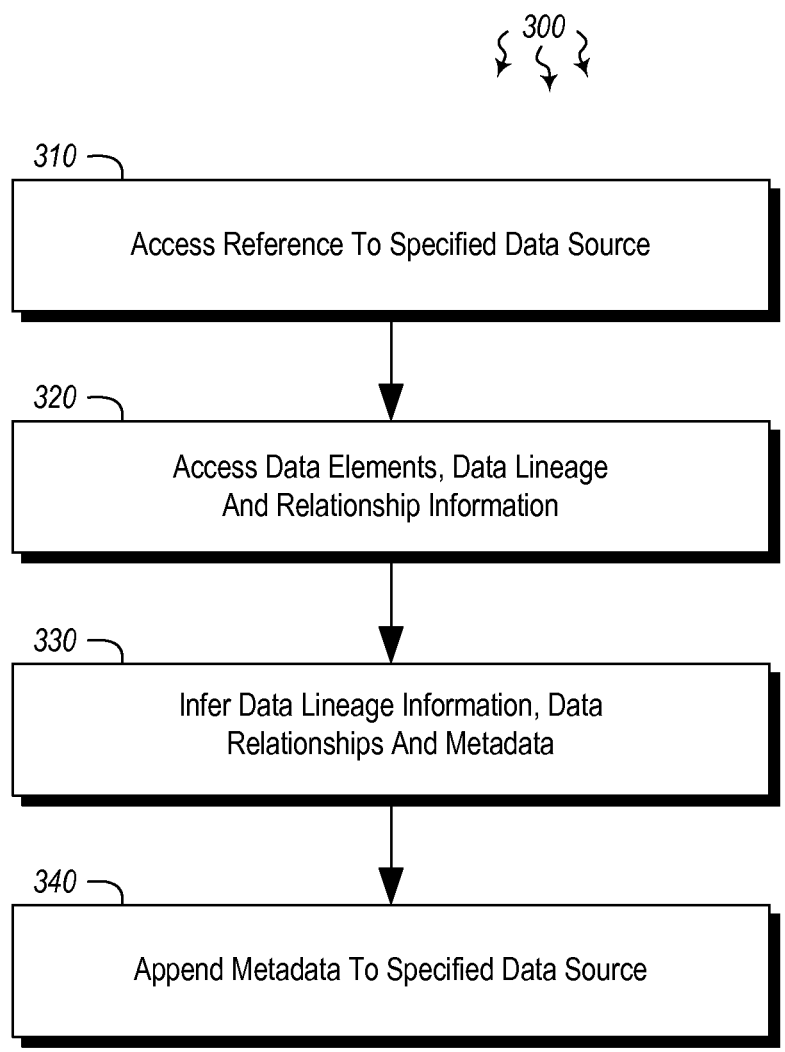
FIG. 3 illustrates a flowchart of an example method for inferring data source metadata at a metadata repository.
Figure 4:
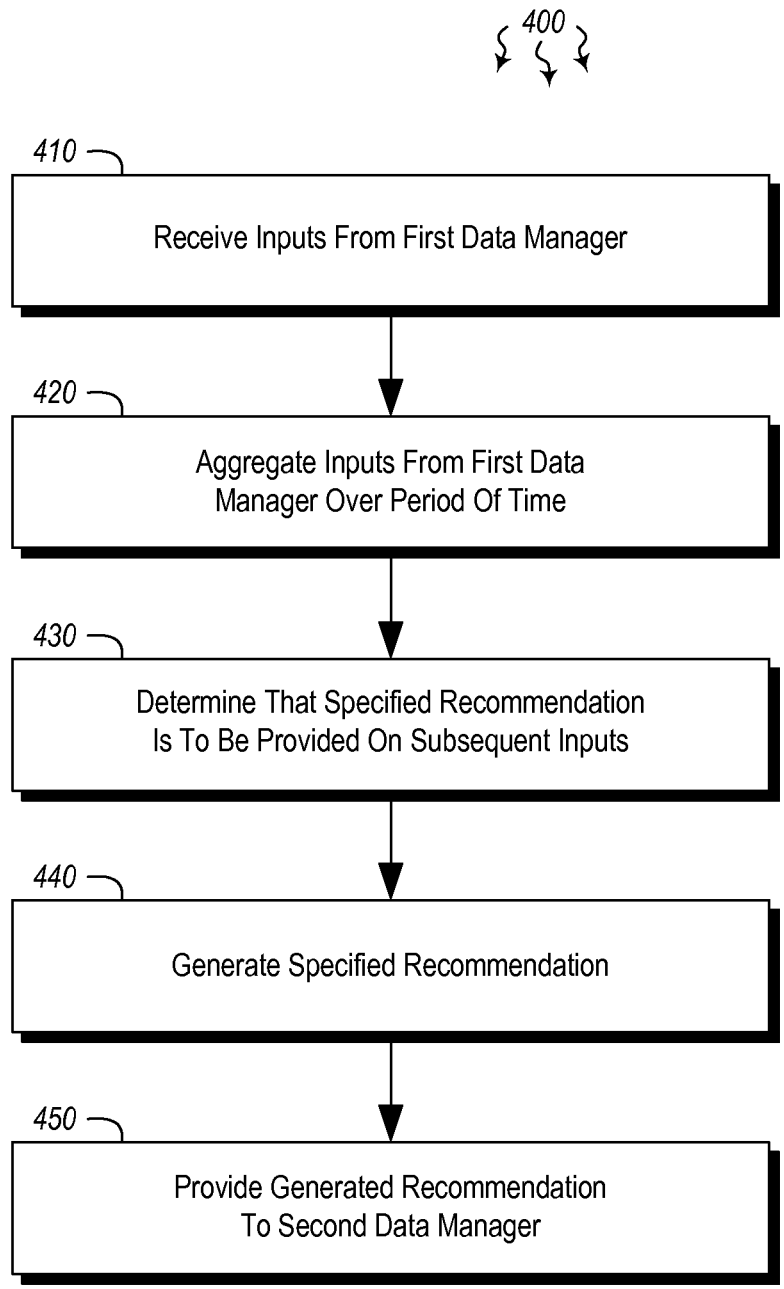
FIG. 4 illustrates a flowchart of an example method for providing recommendations to data managers based on aggregated inputs.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter FIG. 2 illustrates a flowchart of a method 200 for establishing a metadata repository that aggregates metadata for a plurality of data sources. The method 200 will now be described with frequent reference to the components and data of environment 100.

Method 200 includes an act of establishing a reference to one or more data sources, each data source including one or more data elements (act 210). For example, reference establishing module 111 may establish data source references 112 to different data sources 125A-C. The data sources may be local (such as a hard drive on a computer system) or may be remote and/or distributed (such as cloud storage), or a combination thereof. The data sources may be limited to a certain group of one or more data sources, or may be updated to include additional data sources as new sources are found (e.g. by a web crawler). The data source references 112 may link to the data source, and may be dynamically updated if the name or location of the data sources change. Each data source may include one or more data elements 124A-C. In most scenarios, the data sources will include many thousands, millions or more data elements.

Method 200 next includes an act of receiving a data request for one or more specified data elements stored on the one or more data sources (act 220). For instance, user 105 may send data request 106 to (or enter the request at) first computer system 101A. The first computer system 101A may forward the request 106 to second computer system 101B. The data element accessing module may access at least one of the established references to determine which data source the specified data elements are stored on (act 230). Once the data's location is known from the data source references 112, the data elements are retrieved from their determined data source(s) (act 240). The retrieved data elements are then sent to computer system 101A, along with an indication 109 of one or more additional data elements that are relevant to the received data request 106, and a further indication 110 of how those additional data elements are to be accessed (act 250).

Thus, for example, a user may request to access a movie from a cloud data store, or may request access to a work-related spreadsheet in data request 106. The data element accessing module 113 may access the movie or spreadsheet, and return the data 108 along with an indication 109 that there are other movies or spreadsheets that are related to or are similar to the requested movie or spreadsheet. The data elements 108 may also include an indication 110 of how the additional movie or spreadsheet is to be accessed (e.g. by providing proper credentials, or by paying a fee, etc.). These indications may be displayed to the user in UI 107 on computer system 101A. The user may review these indications and, if desired, perform the specified steps to access the additional movie or spreadsheet. Once these steps are performed, the additional data will be sent to the user. The additional data elements may be stored on one or more different data sources, and it should be noted that while three data sources are shown in FIG. 1, substantially any number of data sources may referenced by data source reference 112. In some embodiments, the user's existing credentials will be tried against the additional data sources and, if the attempts fail, the user 105 will be prompted for different credentials.

The second computer system 101B may be further configured to determine lineage information 116 for the accessed data elements (as well as other data elements stored on the data sources). The lineage information 116 indicates the data elements' relationships with other data elements. For instance, if a word processing document is nearly always accessed in conjunction with a slide presentation, the second computer system 101B may determine that a usage relationship exists between the document and the presentation. Similarly, if the document and the presentation were created by the same author, or were created close to the same time, or other criteria may indicate a relationship between the items. In cases where hierarchical data is maintained or provided for a data element, that element's parents, siblings and other relationships 117 may be included in the element's lineage information. This lineage information is described and stored in metadata associated with the data elements in metadata repository 114.

In some embodiments, a data element (e.g. 124A) may comprise a container that includes one data element hosted within another data element (e.g. a table hosted within a database). Lineage information for data elements in a container may be used to determine which information of a parent element to surface within the context of a child element. Thus, for example, if a container includes a parent element and a child element, the lineage information 116 may indicate whether to show and how much information to show about the child element. Data managers may, at least in some cases, specifically identify relationships between data elements. The data manager may know that two or more data elements are related (even if stored on different data stores), and may indicate (e.g. in input 126A) that a relationship between the elements exists, and may further specify what the relationship is (e.g. parent/child relationship or a usage relationship). The computer system 101B may also be configured to infer relationships between data elements based on an indication of where the data elements are stored and which other data elements are related to the data elements, as will be explained further below with regard to method 300 of FIG. 3.

FIG. 3 illustrates a flowchart of a method 300 for inferring data source metadata at a metadata repository. The method 300 will now be described with frequent reference to the components and data of environment 100.

Method 300 includes an act of accessing a reference to a specified data source, the data source including one or more data elements (act 310). For example, computer system 101B may access data source reference 112 which points to data elements stored on one or more of data sources 125A-C. The data element accessing module of computer system 101B may then access data elements 124A-C stored on the data source, data lineage information 116, data relationships 117 and one or more portions of metadata 115 associated with the data source (act 320). From one or more of these items, the inferring module 119 may infer one or more attributes 120 that are to be associated with the data source (act 330). These attributes may include indications of usage for the data source, additional relations to other data sources, indications of updated names for data sources, indications of accessibility updates, or other attributes.

In some cases, user-provided information may be accessed when inferring the attributes 120 that are to be associated with a data source. The user-provided information may include suggestions, hints, annotations or other information. The users may be data managers such as 123A and/or 123B. Accordingly, data managers may provide suggestions, hints, annotations or other information regarding a specific data source or sources. The annotations may indicate, for example, an updated name for the data source, or an updated method of access, an updated location, a new relationship with another data source, or any other type of information about the data source. This information provided by the data manager may be combined with other metadata and contextual information to infer attributes about newly added or existing data sources. These inferred attributes 120 are then appended in metadata to the data source metadata 115 (act 340).

Figure 5:
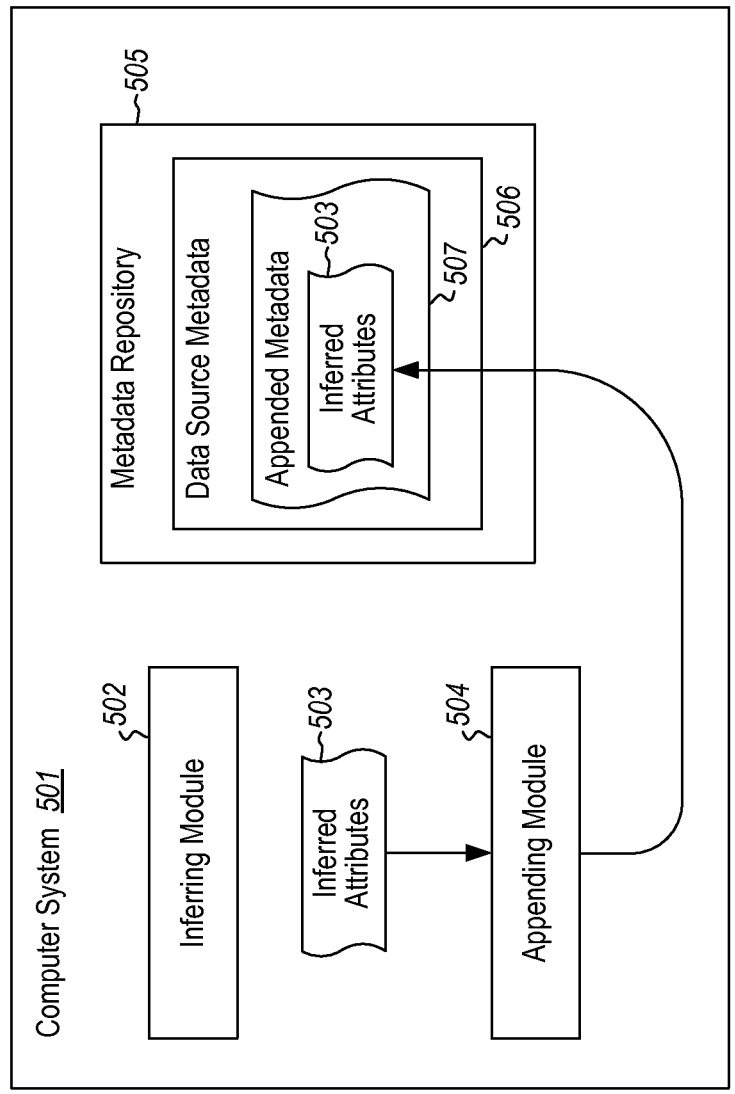
FIG. 5 illustrates an embodiment in which inferred attributes are appended to data source metadata within a metadata repository.

As shown in FIG. 5, for example, inferring module 502 may infer data source attributes 503 based on a variety of existing usage and other data, as well as on data manager-provided information. These inferred attributes 503 are then appended as metadata 507 by appending module 504 to data source metadata 506 within the metadata repository 505. The appended metadata itself can be updated and changed over time as more attributes are inferred from monitored data source usage and/or user-provided information. The metadata repository 505 may include various types of information for each data source including metadata, documentation, workflow access points and other data. The established metadata repository learns from user inputs, such that subsequent metadata repository accesses are alterable based on learned user behavior. For example, the computer system 101B may monitor inputs from data managers 123A and 123B, and may determine some of the inputs overlap, and that those inputs potentially overlap with other managers' inputs. Where the inputs overlap, the computer system 101B may update the metadata repository 114 to reflect the managers' common changes. Then, when subsequent similar inputs are received, the updated changes will be reflected in the metadata repository 114.

The metadata repository further allows users such as data managers to specify access type, credential type, and credential overrides for each data source linked by the metadata repository. Thus, the data manager may specify, for each data source (or even for certain data elements within a data source), who can access the data, how the data can be accessed, which credentials or credential types are to be used, and who and how credential overrides may be used (if at all). Similarly, a data manager may specify that certain data sources are the master data sources, or may limit the number of changes made to certain sources, or may specify that changes have to be ratified by an authorized user or quorum of users.

The metadata repository itself 114 may be hostable in a plurality of locations including on-premises, on the cloud and/or on a federated space. The metadata repository (and the data stored thereon) does not have to be in the same domain, or the same location. Any changes made to the metadata repository 114 may be sent to one or more data managers (e.g. 123A) via notifications. Moreover, when changes notifications are sent, or when metadata is shown to the data managers, it may be filtered so that only relevant data elements are displayed.

In this manner, second computer system 101B may be configured to infer attributes about data sources. The attributes may include descriptions, titles, information about columns or rows in data sources, or other information. The attributes may be inferred by looking at the structure of data, metadata surrounding the data, lineage information, relationship information. These inferred attributes may be applied automatically and as such, over time, the computer system 101B learns appropriate attributes and configurations for the various data sources and updates them automatically.

Turning now to FIG. 4, a flowchart is illustrated of a method for providing recommendations to data managers based on aggregated inputs. The method 400 will now be described with frequent reference to the components and data of environment 100.

Method 400 includes an act of receiving, at a metadata repository, one or more inputs from a first data manager verifying or creating a data relationship between data elements or data sources (act 410). For example, first data manager 123A may send input 126A which verifies or creates a data relationship between data elements 124A-C and/or data sources 125A-C. The first data manager 123A may send many such inputs over a period of time. These inputs may be aggregated by the aggregating module 122 of computer system 101B (act 420). The computer system 101B determines, from the aggregated inputs, that upon receiving a predetermined input from a second data manager, a specified recommendation is to be provided on subsequent data manager inputs (act 430). Thus, for example, if a first data manager 123A has made similar title changes to a series of documents, and then a second data manager 123B provides an input indicating a title change to the same (or a similar) series of documents, the computer system 101B may determine that a recommendation is to be generated for the second data manager recommending the same (or similar) changes made by the first data manager, as indicated by the aggregated inputs.

The recommendation generating module 118 then generates the determined recommendation upon concluding that the second data manager has provided at least one of the predetermined inputs (act 440). Thus, in the example above, the recommendation generating module 118 would generate a recommendation 127 that indicates a similar title changes to that made by the first data manager. This recommendation 127 may then be provided to the second, different data manager based on the second data manager's input (act 450). In this manner, data manager inputs may be monitored and aggregated. Patterns and trends may be noted within the data manager's inputs. These patterns and trends may be noted and learned from, such that subsequent inputs by other data managers will be met with relevant contextual recommendations, based on data managers' past inputs.

In some embodiments, the recommendation generated by the computer system 101B may be provided along with one or more actual past inputs from one or more other data managers, thus showing exactly what the data managers had previously input. As such, each data manager may provide inputs for the data sources they manage. These inputs may be aggregated and combined with other data manager's inputs to create a pool of inputs from which the recommendation generating module 118 may draw. The recommendations may be sent to one or more other data managers, or may be provided as the data manager is providing inputs. A data manager may, for instance, indicate whether a particular data source, or particular data elements within a data source can be certified as official, trusted data, or should share a common name or title. Then, when another data manager is viewing the data source, or is attempting to make annotations to the data source, the data manager may be notified that another data manager has indicated that the data is official, trusted data, and should have a specified title. Many other examples are possible, and this is just one of many attributes which may be changed or updated, or for which recommendations may be provided.

Accordingly, methods, systems and computer program products are provided which establish a metadata repository that aggregates metadata for a plurality of data sources and infer data source metadata at a metadata repository. Moreover, methods, systems and computer program products are provided which provide recommendations to data managers based on aggregated inputs.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system, comprising:
    one or more processors; and
    one or more computer-readable storage media having stored thereon computer-executable instructions that are executable by the one or more processors to cause the computer system to establish a metadata repository that aggregates metadata for a plurality of data sources, the computer-executable instructions including instructions that are executable to cause the computer system to perform at least the following:
        establish a reference to one or more data sources, each data source including one or more data elements;
        receive a data request for one or more specified data elements stored on the one or more data sources;
        access at least one of the established references to determine upon which data source the specified data elements are stored;
        retrieve at least one of the specified data elements from its determined data source; and
        send, to a specified computer system, (i) the retrieved data elements, (ii) a first indication comprising one or more additional data elements that are relevant to the received data request, and (iii) a second indication comprising how those additional data elements are to be accessed, wherein at least one of the one or more additional data elements associated with the first indication comprises a container that includes a first data element hosted within a second data element.

2. The computer system of claim 1, wherein the additional data elements are stored on one or more different data sources.

3. The computer system of claim 1, wherein lineage information is determined for one or more of the data elements, the lineage information indicating the data elements' relationships with other data elements.

4. The computer system of claim 3, wherein the lineage information is described in metadata associated with the data elements.

5. The computer system of claim 4, wherein at least one of the data elements also comprises a container that includes a child data element hosted within a parent data element, wherein lineage information included within the container is used to determine at least one of the one or more additional data elements associated with the first indication.

6. The computer system of claim 1, wherein inputs are received from one or more data managers with regard to data elements owned or managed by the one or more data managers, the one or more data managers comprising users that are authorized to modify the metadata repository, wherein the inputs received from the one or more data managers over a specified period of time are aggregated to determine how the one or more data managers are interacting with their data elements.

7. The computer system of claim 6, wherein one or more data element management recommendations are generated for at least one other data manager based on the received, aggregated inputs and the recommendation is sent to the at least one other data manager.

8. The computer system of claim 1, wherein one or more relationships between data elements is inferred based on an indication of where the data elements are stored and which other data elements are related to the data elements.

9. The computer system of claim 1, wherein a data manager specifies one or more relationships between data elements, the data manager comprising a user that is authorized to modify the metadata repository.

10. A method, implemented at a computer system that includes one or more processors, for establishing a metadata repository that aggregates metadata for a plurality of data sources, the method comprising:
    establishing a reference to one or more data sources, each data source including one or more data elements;
    receiving a data request for one or more specified data elements stored on the one or more data sources;
    accessing at least one of the established references to determine upon which data source the specified data elements are stored;
    retrieving at least one of the specified data elements from its determined data source; and
    sending, to a specified computer system, (i) the retrieved data elements, (ii) a first indication comprising one or more additional data elements that are relevant to the received data request, and (iii) a second indication comprising how those additional data elements are to be accessed, wherein at least one of the one or more additional data elements associated with the first indication comprises a container that includes a first data element hosted within a second data element.

11. The method of claim 10, further comprising:
    accessing the established reference to at least one of the one or more data sources;
    accessing at least one of the following: data elements stored on the at least one data source, data lineage information, data relationships, or one or more portions of metadata associated with the at least one data source; and
    inferring, from at least one of the data elements stored on the at least one data source, the data lineage information, the data relationships and the one or more portions of metadata associated with the data source, one or more attributes that are to be associated with the at least one data source.

12. The method of claim 11, further comprising appending the one or more inferred attributes to metadata of the at least one data source within the metadata repository.

13. The method of claim 12, wherein the metadata repository includes one or more of the following for each data source: metadata, documentation, or a workflow access point.

14. The method of claim 13, wherein the metadata repository learns from user inputs, such that subsequent metadata repository accesses are alterable based on learned user behavior.

15. The method of claim 13, wherein the metadata repository allows users to specify at least one of access type, credential type, or credential overrides for each data source linked by the metadata repository.

16. The method of claim 13, wherein the metadata repository is hostable in a plurality of locations including at least one of the following: on-premises, on cloud, or on a federated space.

17. The method of claim 13, wherein a data manager is notified of any changes made to the metadata repository, the data manager comprising a user that is authorized to modify the metadata repository.

18. The method of claim 12, wherein the appended metadata is filtered such that only relevant data elements are displayed.

19. The method of claim 11, wherein user-provided information is accessed when inferring the one or more attributes that are to be associated with the at least one data source, the user-provided information comprising one or more of the following: suggestions, hints, or annotations.

20. A computer program product comprising one or more hardware storage devices having stored thereon computer-executable instructions that are executable by one or more processors of a computer system to establish a metadata repository that aggregates metadata for a plurality of data sources, the computer-executable instructions including instructions that are executable to cause the computer system to perform at least the following:
establish a reference to one or more data sources, each data source including one or more data elements;
receive a data request for one or more specified data elements stored on the one or more data sources;
access at least one of the established references to determine upon which data source the specified data elements are stored;
retrieve at least one of the specified data elements from its determined data source; and
send, to a specified computer system, (i) the retrieved data elements, (ii) a first indication comprising one or more additional data elements that are relevant to the received data request, and (iii) a second indication comprising how those additional data elements are to be accessed, wherein at least one of the one or more additional data elements associated with the first indication comprises a container that includes a first data element hosted within a second data element.

* * * * *